(No Model.)
T. H. WHITE.
STEAM BOILER FEEDER.
No. 343,878. Patented June 15, 1886.
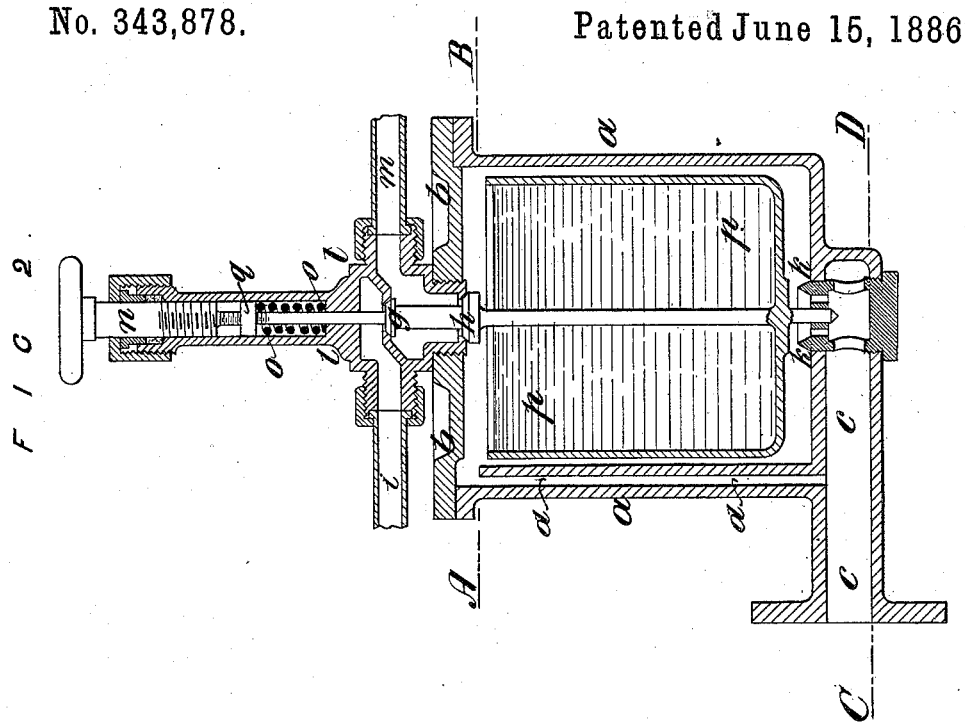
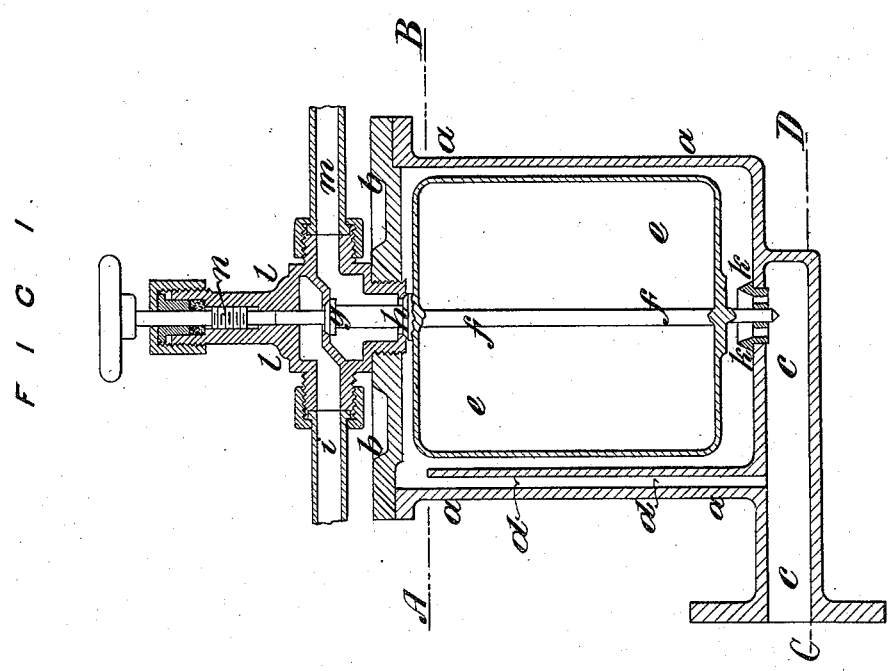
Witnesses:
James J. Tobin
William P. Davis
Inventor
Thomas H. White
by his Attorney
Charles Horton

United States Patent Office.

THOMAS H. WHITE, OF SALFORD, MANCHESTER, COUNTY OF LANCASTER, ASSIGNOR TO JOHN HOLROYD, OF MANCHESTER, ENGLAND.

STEAM-BOILER FEEDER.

SPECIFICATION forming part of Letters Patent No. 343,878, dated June 15, 1886.

Application filed March 9, 1886. Serial No. 194,597. (No model.) Patented in England November 14, 1884, No. 15,015.

*To all whom it may concern:*

Be it known that I, THOMAS HENRY WHITE, a subject of the Queen of Great Britain and Ireland, and residing at Salford, Manchester, county of Lancaster, England, engineer, have invented certain Improvements in Apparatus for Controlling the Supply of Steam to Boiler-Feeders, (for which I have obtained a patent in Great Britain, No. 15,015, November 14, 1884,) of which the following is a specification.

My invention relates to means for controlling the supply of steam of apparatus used in the feeding of steam-generators with water. I connect with the steam-generator a chamber containing a float or load, which opens a steam-valve when steam is admitted to the chamber through the lowering of the water-level in the generator.

In the accompanying drawings, Figure 1 represents a vertical section of my apparatus. Fig. 2 represents a corresponding section of a modified form of the same apparatus.

In the figures, $a$ is a hollow casing, which is closed by means of a cover, $b$, so as to form a chamber, which is connected by means of a branch pipe, $c$, with the steam-generator which is to be supplied with water. The connection of the pipe with the generator must be made at such a level as that the water within the generator can fall sufficiently low to admit steam into the pipe $c$—say, to about the level indicated by the line C D. The high-water level may be about as indicated by the line A B. A passage, $d$, extends from the pipe $c$ to about the level A B, or otherwise to the high-water level. Within the chamber is a hollow float, $e$, which is fixed upon a spindle, $f$, which is provided with two valves, $g$ and $h$. So long as the generator does not require to be fed with water the space between the float and the outer casing is filled with water to the level A B, or thereabout, and the buoyancy of the submerged or partly-submerged float is sufficient to keep the valve $g$ closed against the pressure of steam which is admitted to the pipe $i$. When the float is in the higher position, which keeps the valve $g$ closed, there is a free communication through passages in a valve-seating, $k$, between the interior of the chamber and the pipe $c$. A surface is prepared upon the bottom of the float to sit truly upon this seating, so that when the float drops it rests upon the seating and closes the passage through the same. The two ends of the spindle $f$ are fitted to slide in bearings formed in the seating $k$ and in the upper steam-valve-casing body $l$. A pipe, $m$, communicates with the injector or donkey-pump or other apparatus used to force water into the generator.

The action of the apparatus is as follows: When the water in the generator falls—say, to the level C D—steam passes into the pipe $c$ and through the passage $d$ to the upper end of the chamber, displacing water which flows through the passages in the seating $k$ until the float, being no longer sustained, drops and opens the valves $g$ and $h$, whereby steam is admitted to the pipe $m$, and is conveyed to the injector or pump. By opening the valve $h$ steam has also free access to the chamber at all times until the float rises again to close the valves. When the float drops, the passages in $k$ are closed, and water can then only enter the chamber through the passage $d$, so that the valves $g$ and $h$ remain open until the water-level in the generator has risen to the level A B, when water will pass from the upper end of $d$ into the chamber until the float is lifted and the valves $g$ and $h$ are again closed. A screwed spindle, $n$, is provided, in order that by turning such spindle at any time the float can be depressed and the valve $g$ be opened, so as to permit steam to pass to the pipe $m$.

In the modification illustrated by Fig. 2, the valve $g$ is kept closed by means of a spiral-spring $o$, and a basin, $p$, loaded with water, is substituted for the float $e$, the action being the same as in the example illustrated by Fig. 1, with the exception that the basin or load $p$ has no buoyancy, the spring $o$ taking the place of the buoyancy of the float. When the water runs out of the chamber, the weight of the basin $p$, which remains full of water, overcomes the power of the spring, and the valves $g$ and $h$ are opened. The spring acts against a collar, $q$, upon the spindle $f$, and this collar is tapped to suit the thread of a screw upon the spindle, so that by turning the collar the power of the spring can be regulated to suit the pressure of the steam upon the valve $g$.

I claim—

1. In an apparatus for opening and closing the steamway to feeders for steam-generators, the combination of the hollow vessel a, the pipe c, for connecting with the steam-generator, the passage d, with the spindle carrying the valves g and h, partially balanced to close when the vessel is nearly full of water, the steam-chest l, and the valve-seat k, all substantially as set forth.

2. In apparatus for opening and closing the steamway to injecting, pumping, or forcing feeders for steam-generators, the hollow vessel a, the pipe c, for connecting with the steam-generator, the passage d, the float e, the valves g and h in the steam-valve l, and the valve-seating k, substantially as set forth.

In testimony whereof I have signed my name to this specification in the presence of two subscribing witnesses.

THOMAS H. WHITE.

Witnesses:
EDWARD K. DUTTON,
ARTHUR LEDGER.